United States Patent [19]
Jacobucci

[11] Patent Number: 4,813,458
[45] Date of Patent: Mar. 21, 1989

[54] ICE, FROST, AND SNOW SCRAPER FOR VEHICLE WINDSCREENS

[76] Inventor: Daniel G. C. Jacobucci, 35 Glenview Avenue, Winnipeg, MB, Canada, R2M 1W3

[21] Appl. No.: 138,212

[22] Filed: Dec. 28, 1987

[51] Int. Cl.$^4$ .............................. B60S 1/04; A47L 1/06
[52] U.S. Cl. .............................. 15/236.02; 15/236.08; 30/169
[58] Field of Search ............. 15/143 R, 143 B, 144 R, 15/145, 236 R; 294/1.1, 25, 57, 58; 81/487; 30/169, 296 R, 298, 312, 314, 340, 342, 491; 16/110 R; 7/167

[56] References Cited

U.S. PATENT DOCUMENTS

| | | | |
|---|---|---|---|
| 496,521 | 5/1893 | Low | 30/298 |
| 969,528 | 9/1910 | Disbrow | 30/169 |
| 2,546,113 | 3/1951 | Spang | 294/25 X |

*Primary Examiner*—Edward L. Roberts

[57] ABSTRACT

A tool for scraping ice, frost, and snow from a vehicle's windscreen and windows with very little time and effort comprising of a center handle (28) which acts as a fulcrum, and two lever arms (30R and 30L) which act as levers, which incurve and join each other to form the forearm rest (32) at the rear extermity of the unit. The forearm rest sits on the user's forearm when using the device in a horizontal scraping direction. The levers form contoured arms (26R and 26L) towards the front of the unit, ahead of the center handle. These contoured arms hold the scraping blade (22) and the scraping teeth (20), which are supported by the reinforcing plate (24) between the contoured arms. The device facilitates the act of cleaning winter elements off a windscreen or window through the use of leverage provided by the user's hand acting as a fulcrum and one's forearm supplying the leverage necessary to create substantial downward pressure on the surface to be scraped without the extensive reach needed with conventional scrapers.

12 Claims, 4 Drawing Sheets

ICE, FROST, AND SNOW SCRAPER FOR VEHICLE WINDSCREENS

BACKGROUND

DESCRIPTION OF PRIOR ART

Drivers of cars, trucks, etc. are all subject to ice, snow, or frost accumulating on the windscreen and windows of their vehicle, whether it be at home, work, or any place where the vehicle is exposed to any kind of winter elements.

Heretofore a wide variety of scrapers have been proposed and implemented for scraping these winter elements off a vehicle's windscreen and windows.

One such tool consisted of a rigid two part handle—(U.S. Pat. No. 4538320-A to Batt 85.09.03). The first part has, at an end opening bounded by an end face, a second part embodying a blade. The second part is inserted into the opening in the first part. A mitt is positioned about the handle to cover the handgrip and to leave the beveled blade exposed. The opening of the mitt is sufficiently large to admit a gloved or ungloved hand grasping the handgrip. Users regard this type of tool unsatisfactory for scraping a vehicle's windscreen, because while a person is grasping the handle of this tool and attempts to scrape the center of the vehicle's windscreen, the amount of force that can be applied to the icy surface is only as great as the stength of one's wrist. Due to the fact that the length of the scraper is rather short, a long reach is needed to scrape the center of the windscreen of a vehicle, particularly a larger type vehicle such as pickup trucks or vans. While reaching, the arm cannot exert a sufficient amount of downward pressure to utilize the scraping ability of the tool. To achieve the scarping effect one must literally rub against the side of a usually dirty car, and even stretch over the hood of the vehicle to apply the needed pressure to clean the surface of the center of the windscreen. This is even moreso for female drivers as their arm and wrist strength tend to be less than that of an adult male. The mitt enclosing the handle of this scraper is next to useless as well. One would have to judge the intelligence of an individual who proceeds to the outdoors in the middle of winter with no gloves or the necessary apparel to begin with. Even if used as directed, the glove would provide very little warmth to the user's hand, gloved or ungloved, as it would be as cold as the temperature outside as these devices are almost always left in the vehicle while parked.

There are also many types of tools on the market today similar to the aforementioned without the mitt (U.S. Pat. No. 4,141,111 and 4,275,476 both to E. L. Hopkins). These tools are almost identical except for very subtle differences. They still, however, are inferior due to the reasons listed above.

Another type of tool, comprise a simple length of wood usually measuring about two (2) feet, with a brush at one end and a small plastic scraping edge on the opposite end. With this tool, users must use both hands to effectively scrape ice off the vehicle's windscreen. This causes the tool to be just as inferior as the aforementioned in that while using both hands to reach the center of a vehilce's windscreen, the same problems arise with respect to the extended reach and the inability to apply adequate pressure to the icy surface due to this extended reach. This principle also applies to (U.S. Pat. No. 4,422,206 to Brace and Chmielewski) and any other scraper which takes two hands to effectively use.

Making a longer handle for reach does not solve any problems in that the user must use two hands to control the apparatus, thus limiting reach. Most users, therefore, would find it desirable to have a tool which could effectively scrape ice, frost, or snow off the center of vehicle windscreens and windows with very little physical reach involved, and a modicum amount of force needed to achieve the end result of a clean surface. This tool must also be easy to use on all the windows around the entire vehicle and be inexpensive to the consumer to purchase.

OBJECTS AND ADVANTAGES

Accordingly we claim the following as our objects and advantages of the invention: to provide a tool for easy, reliable, and effective removal of ice, snow, and frost off vehicle windscreens and windows, to provide a tool that will remove these winter elements off the center of vehicle windscreens with very little effort, reach and force exerted, to provide a tool which will remove winter elements such as ice, snow, and frost off all the windows around an entire vehicle, to provide a tool which requires a minimum of skill and training to use, and to provide such a tool which can do a complete job of scraping without the need of physically straining the user through extensive reaching or stretching of one's body or from the extensive amount of pressure on one's wrist.

In addition we claim the following additional objects and advantages: to provide an ice scraping tool which can effectively clean a vehicle's windscreen and windows in very little time and with great precision in that it needs to only go over the surface once to remove the winter elements and not several times, and to provide an ice scraping tool to satisfy the neophile's need for excitement in purchasing a superior and novel product.

The aforementioned objects and advantages are to overcome the disadvantages of prior art such as: the inability to effectively reach the center of a vehicle's windshield, the inability to exert a sufficient amount of pressure on such a surface to be scraped due to the extensive reach needed, the rubbing of the user's body against the side of a usually dirty car in order to achieve the needed reach to the center of the windshield, the great amount of physical stress on the user's wrist when applying the needed pressure to effectively remove the winter elements, the use of both hands by the user to effectively use and control a longer apparatus, the repeated scraping motions needed to clean the same surface due to the inability to exert adequate pressure on the said surface, the physical stress to the user in scraping the windscreen and windows of a larger vehicle such as a pickup truck or van, the inability for females to cope with tools requiring a great amount of strength to effectively utilize, the failure to utilize the user's total arm and shoulder strength along with that of one's wrist.

Readers will find further objects and advantages of the invention from a consideration of the ensuing description and the accompanying drawings.

DRAWING FIGURES

Figure 1:
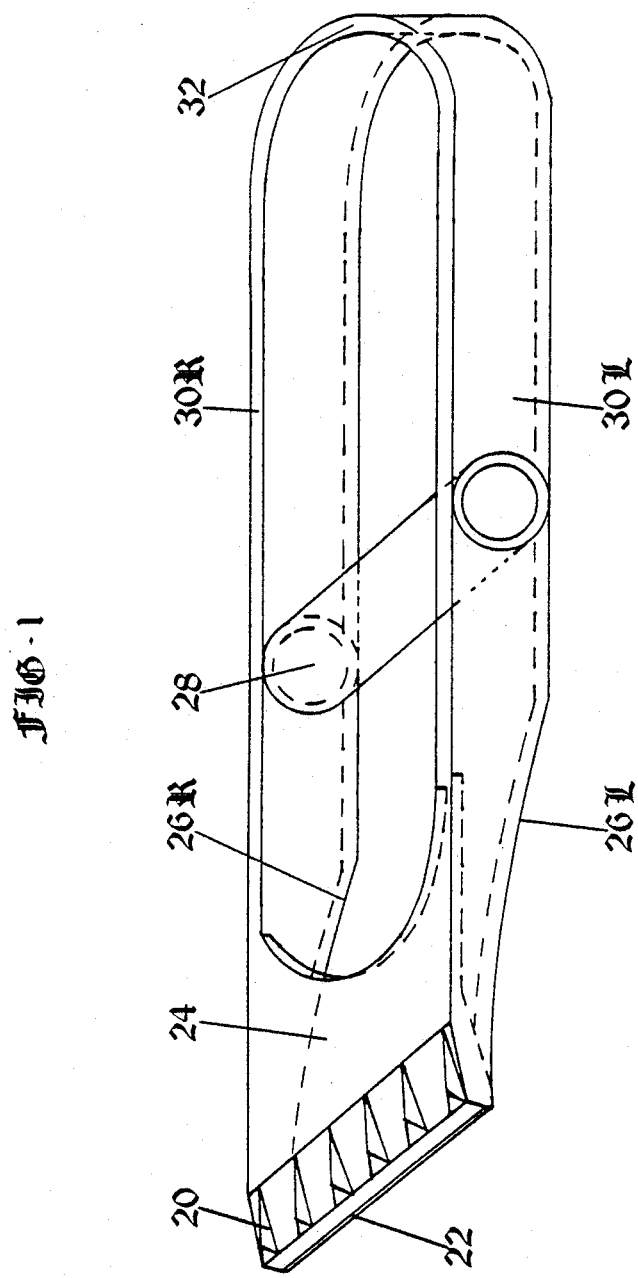
FIG. 1 shows a perspective view of an ice scraper embodying the invention.

DRAWING REFERENCE NUMERALS 20 scraping teeth
22 scraping blade
24 reinforcing plate
26R contoured arm- right side
26L contoured arm- left side
28 center handle
30R lever arm- right side
30L lever arm- left side
32 forearm rest

DESCRIPTION OF THE PREFERRED EMBODIMENT

Figure 4:
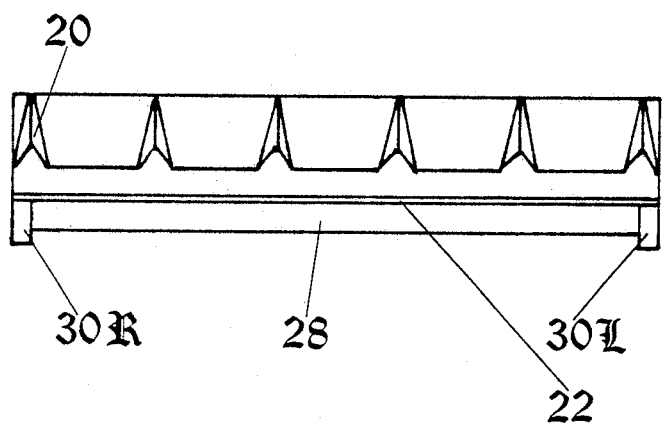
FIG. 4 shows a front elevational view of the scraper of FIG. 1.

FIG. 1 shows the single piece tool according to the preferred embodiment of the invention. The tool comprises scraping teeth 20 which are located directly above the scraping blade 22. FIG. 4 shows a detailed view of the scraping teeth 20 and the scraping blade 22. The width of the scraping blade 22, measures about 127 mm. The reinforcing plate 24 is located directly behind the scraping teeth 20 and is the same level as the top of the said scraping teeth. The reinforcing plate 24 is about 127 mm in width and extends to approximately 115 mm in length on each side with a circular incurvation at the rear side of the said reinforcing plate. The thickness of the reinforcing plate 24 is approximately 3 mm. The The said reinforcing plate 24 is located on the top portion of the contoured arms 26R and 26L which are parallel to each other. These contoured arms 26R and 26L are contoured at approximately a 10 degree angle from the base of the lever arms 30R and 30L. The contoured arms 26R and 26L are approximately 6 mm in width and range from a height of approximately 25 mm to about 8 mm.

The center handle 28 is about 25 mm in diameter and is round with a hole through the center of about 19 mm in diameter. This 19 mm hole extends through the lever arms 30R and 30L to create a 19 mm hole through the entire unit. The middle of the center handle 28 is located approximately 190 mm from the front of the scraping blade 22.

The contoured arms 26R and 26L extend past the center handle 28, and continue parallel to each other until they incurve towards each other and meet. The length extending from the middle of the center handle 28 to the incurvature is referred to as the lever arms 30R and 30L. The said incurvature to where the lever arms 30R and 30L join is referred to as the forearm rest 32. The said lever arms 30R and 30L are approximately 6 mm in width and have a height of about 25 mm. The length from the middle of the center handle 28 to the back of the forearm rest 32 is approximately 165 mm. The forearm rest 32 also has a width of about 6 mm and a height of approximately 25 mm similar to the lever arms 30R and 30L.

The aforementioned one piece unit is made of plastic and can be clear, or any color desired upon the coloring of the plastic. The said unit will be produced through injection moulding. Any suitable material substance can also be used to produce this product such as a nylon, acrylic, polycarbonate, polyethylene, etc. depending on the manufacturor's specifications.

TOOL OPERATION

Figure 2:
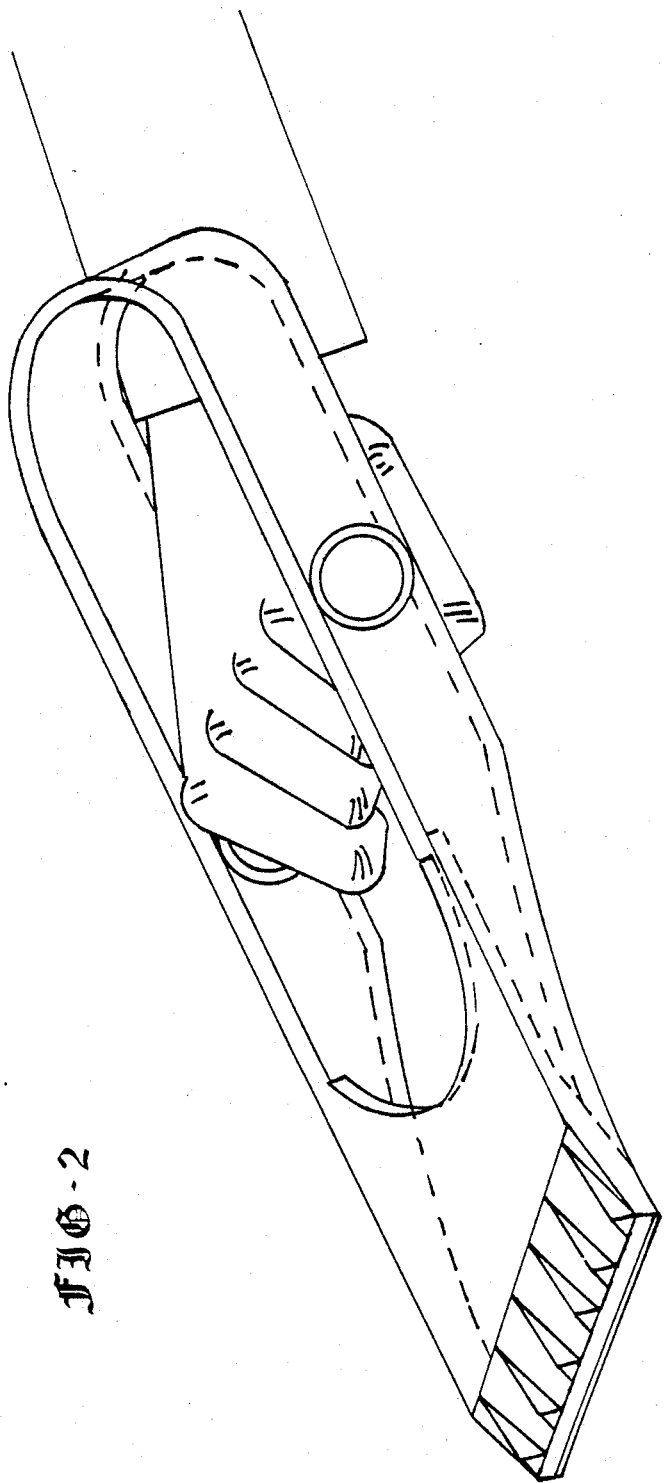
FIG. 2 shows a perspective view of the scraper of FIG. 1 in which to hold the device to remove ice in a horizontal manner (front and back windows of a vehicle).

The single piece tool of FIG. 1 will perform a variety of scraping functions. To scrape the front windscreen of a vehilce, the user should insert their hand through the opening located between the lever arms 30R and 30L while grasping the center handle 28 as shown in FIG. 2. The forearm rest will then be resting approximately halfway up the user's forearm. The scraping blade 22 should then be put in direct contact with the surface the user wishes to clean, in this case the front windscreen of a vehicle. The user then pushes the device forward along the windscreen applying a slight downward pressure which would ulitmately come from the user's hand, wrist, arm, and shoulder, thus enabling a great amount of pressure to be applied with very little effort to the user. The scraping action to be used is very similar to that of conventional ice scrapers, but the effort needed and the results are far superior with this new invention which takes advantage of the force exerted by the user's whole arm and shoulder, and not only that of the user's wrist.

To utilize the scraping teeth 20 we will refer to the same situation as stated above. The scraping teeth 20 are to be used to "crack" or scrape heavy deposits of ice on the windscreen. To employ the scraping teeth 20, the user simply has to turn the unit around, so that the scraping teeth 20 are facing downward, and repeat the aforementioned process.

Figure 3:
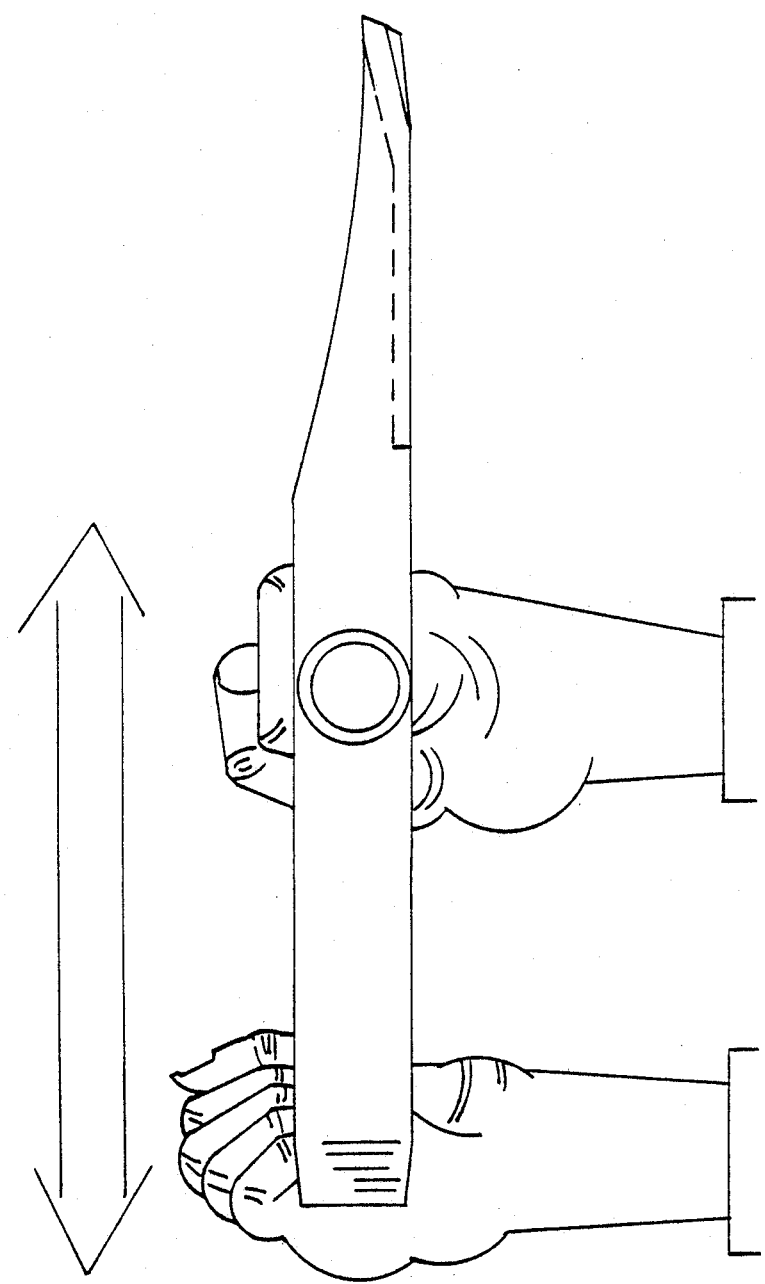
FIG. 3 shows a side view of the scraper of FIG. 1 in which to hold the device to remove ice in a vertical manner (side windows of a vehicle).

To scrape an area such as the side windows of a vehicle, which are lower to the ground and does not require extensive reach, the user should grasp the center handle 28 with their left hand, and grasp the forearm rest 32 with their right hand in the manner indicated in FIG. 3. The scraping blade 22 should then be put in direct contact with the surface the user wishes to clean. A scraping motion should then be employed while applying pressure. This motion can either be up or down, or side to side, whichever is preferred by the user.

To utilize the scraping teeth 20 in this instance the user simply has to turn the unit around so that the scraping teeth 20 are facing the surface to be cleaned, then proceed with the aforementioned procedure, as with the scraping blade 22.

If the user is left handed, the procedure remains the same except that the right hand should be used to grasp the center handle 28, and the left hand should grasp the forearm rest 32.

The contoured arms 26R and 26L enable the device to achieve a scraping angle to the icy surface in which the user can most efficiently clean the said icy surface. At no time does any part of the device come in contact with the surface to be cleaned, other than the scraping blade 22 and the scraping teeth 20. This alows for less contact with the surface, and more efficient cleaning in that 100% of the pressure is focused on the scraping blade 22 and not needless contact.

The reinforcing plate 24 enables the user to apply great pressure in the aforementioned scraping proceedures, and yet enables the contoured arms 26R and 26L to remain stable and firm. This is very important due to the fact that since the device utilizes pressure from the user's hand all the way up to, and including the shoulder, this is a substantial amount of force on the apparatus that is not present in any other conventional scraper.

Thus this apparatus is well designed to accept an abundant amount of pressure.

The theory behind the device is rather simple. If you refer back to FIG. 2, you will notice that the user is grasping the center handle 28, and the forearm rest 32 is resting on top of the user's forearm. The center handle 28 acts as the fulcrum in this case; it is the center point in which the force exerted by the user is transferred to pressure on the icy surface. The lever arms 30R and 30L in the diagram act as just that, levers. With the employment of both the center handle 28 and the lever arms 30R and 30L together, this greatly multiplies the amount of force exerted by the user to the scraping end of the device. The end result is more scraping pressure where it is needed, on the icy surface. Ultimately the chore cleaning windscreens and windows of ice, snow, or frost is less demanding physically, cleaner faster, and more economical as this device can be mass produced through injection moulding and marketed very competitively over inferior prior art. The reader will see that the said ice scraper provides a highly reliable, light weight, efficient yet economical device which can be used by persons of almost any age.

While the above description contains many specificities, the reader should not construe these as limitations on the scope of the invention, but merely as exemplifications of preferred embodiments thereof. Those skilled in the art will envision many other possible variations are within its scope. For example skilled artisans will readily be able to change the dimensions and shapes of the various embodiments. They will also be able to make the device of alternative materials such as different plastics, wood or metal. They can make many variations to the center handle 28, by making it triangular, square, or almost any shape that would comfortably accept the grasp of one's hand. They can make the shape of the contoured arms 26R and 26L vary in angle and size as long as they do not come in contact with the surface to be scraped. They can also change the shape of the reinforcing plate 24, as long as it provides the contoured arms 26R and 26L enough support to keep them rigid and stable enough to accept the amount of applied pressure during use. They can chnage the size and number of scraping teeth 20 along with the size and angle of the scraping blade 22 so long as it sufficiently clears the ice or frost off a vehicle's windscreen and windows. Accordingly the reader is requested to determine the scope of the invention by the appended claims and their legal equivalents, and not by the examples which have been given.

We claim:

1. A mutually operable tool for scraping ice, snow, or frost from a surface to be scraped, said scraper comprising a one-piece body defining:
    a scraping section at one end thereof comprising:
        a scraping blade extending downward from a reinforcing plate;
        a contoured arm connected on each side of the reinforcing plate opposite each other, with the slender part of the said contoured arms connected on each side of the scraping blade, and
        a plurality of scraping teeth on top of the said scraping blade; a handle section extending from said contoured arms comprising:
        a center handle connected at each end to the said contoured arms, and
    a lever arm connected to each of the said contoured arms extending to the rear extremity;
    a forearm rest section comprising:
        an incurvature of each of said lever arms which join each other;
    said scraper being operable during scraping to permit force to be applied on a surface to be scraped with the hand or hands of the user, when either gripping the said center handle with the said forearm rest sitting on top of the user's forearm, or by gripping the said center handle with one hand and the said forearm rest with the other hand,
    said scraper providing a fulcrum and lever action of pressure applied to a surface through said center handle and forearm rest.

2. The scraper of claim 1 wherein the entire scraper is comprised of plastic.

3. The scraper of claim 1 wherein said center handle is round.

4. The scraper of claim 1 wherein said center handle is shaped to comfortably receive the user's hand grip.

5. The scraper of claim 1 wherein said forearm rest is a semi-circular shape.

6. The scraper of claim 1 wherein said forearm rest is a rectangular shape.

7. The scraper of claim 1 wherein said scraping teeth are rectangular in shape.

8. The scraper of claim 1 wherein said scraping teeth are triangular in shape.

9. A manually operable tool for scraping ice, snow, or frost from a surface to be scraped, said scraper defining:
    a scraping section at one end comprising:
        a scraping blade attatched at opposite ends to contoured arms, and
        a plurality of scraping teeth on top of the said scraping blade;
    a handle section extending from said contoured arms comprising:
        a center handle connected at opposite ends to said contoured arms, and
        a lever arm connected to each of the said contoured arms;
    a forearm rest section comprising: an incurvature of each of the said lever arms.

10. The scraper of claim 9 wherein said lever arms join each other at the end of the incurvature.

11. The scraper of claim 9 wherein said center handle is round.

12. The scraper of claim 9 wherein the said scraping blade is supported by a reinforcing plate which in turn is attatched to said contoured arms.

* * * * *